United States Patent
Vance et al.

(10) Patent No.: US 9,925,663 B2
(45) Date of Patent: Mar. 27, 2018

(54) MOVABLE HARDSTOP FOR A ROBOTIC COMPONENT

(71) Applicant: Universal City Studios LLC, Universal City, CA (US)

(72) Inventors: Eric Vance, Ocoee, FL (US); Steven C. Blum, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 44 days.

(21) Appl. No.: 15/204,780

(22) Filed: Jul. 7, 2016

(65) Prior Publication Data

US 2018/0009104 A1    Jan. 11, 2018

(51) Int. Cl.
*B25J 9/10* (2006.01)
*B25J 9/16* (2006.01)

(52) U.S. Cl.
CPC ............. *B25J 9/101* (2013.01); *B25J 9/1664* (2013.01)

(58) Field of Classification Search
CPC ............................... B25J 9/101; B25J 9/1664
USPC ....................................................... 700/245
See application file for complete search history.

(56) References Cited

U.S. PATENT DOCUMENTS

| | | | | |
|---|---|---|---|---|
| 3,662,610 A | * | 5/1972 | Thoen | G05G 5/04 74/10.2 |
| 4,828,094 A | | 5/1989 | Torii et al. | |
| 4,934,504 A | | 6/1990 | Torii et al. | |
| 5,220,849 A | * | 6/1993 | Lande | B05L 313/005 74/479.01 |
| 5,508,686 A | * | 4/1996 | Nihei | B25J 9/101 340/679 |
| 5,839,322 A | * | 11/1998 | Genov | B25J 9/101 414/918 |
| 6,123,185 A | * | 9/2000 | Demarest | A61B 17/06 198/431 |
| 6,601,468 B2 | * | 8/2003 | Grover | B25J 9/042 414/744.5 |
| 8,757,345 B2 | | 6/2014 | Blank et al. | |
| 2014/0209382 A1 | * | 7/2014 | Smith | E21B 19/20 175/24 |
| 2015/0081096 A1 | | 3/2015 | Shiraki et al. | |
| 2017/0112580 A1 | * | 4/2017 | Griffiths | A61B 90/50 |

FOREIGN PATENT DOCUMENTS

| | | |
|---|---|---|
| JP | S6219342 | 1/1987 |
| JP | 2002331531 | 11/2002 |
| JP | 2013111718 | 6/2013 |

OTHER PUBLICATIONS

PCT/US2017/040961 International Search Report and Written Opinion dated Oct. 19, 2017.

* cited by examiner

*Primary Examiner* — Jaime Figueroa
(74) *Attorney, Agent, or Firm* — Fletcher Yoder, P.C.

(57) ABSTRACT

A robotic system includes a robotic arm and a movable hardstop disposed proximate to the robotic arm. The movable hardstop is separated from the robotic arm by at least one clearance in a first operating condition. The movable hardstop physically contacts the robotic arm in a second operating condition. The robotic system also includes one or more controllers configured to control movement of the robotic arm and movement of the movable hardstop such that the first operating condition is maintained or such that, if the second operating condition occurs, the hardtop blocks movement of the robotic arm.

20 Claims, 5 Drawing Sheets

MOVABLE HARDSTOP FOR A ROBOTIC COMPONENT

BACKGROUND

The present disclosure relates generally to the field of robotics. More specifically, embodiments of the present disclosure relate to a movable hardstop for a movable robotic component (e.g., a robotic arm).

Robotic systems are employed in a number of technical fields, including manufacturing, medical, and entertainment industries. For example, robotic systems may employ movable robotic components configured to facilitate assembly of components or systems in a manufacturing plant. Robotic systems may also include control devices configured to limit motion of the movable robotic components for various reasons, including protection of the robotic system. It is now recognized that motion limitations caused or facilitated by the control device may unnecessarily limit operation or fluidity of the movable robotic component. Consequently, the control device may unnecessarily limit performance or efficiency of the movable robotic component in traditional systems. Thus, improved control devices are needed to enable better performance and efficiency of movable robotic components.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a robotic system includes a robotic arm and a movable hardstop disposed proximate to the robotic arm. The movable hardstop is separated from the robotic arm by at least one clearance in a first operating condition. The movable hardstop physically contacts the robotic arm in a second operating condition. The robotic system also includes one or more controllers configured to control movement of the robotic arm and movement of the movable hardstop such that the first operating condition is maintained or such that, if the second operating condition occurs, the hardtop blocks movement of the robotic arm.

In accordance with another embodiment, a control system for a robotic system includes a controller having a processor and a memory, where the memory is configured to store instructions that, when executed by the processor, cause the controller to perform acts. The acts include mapping a first path of movement for a robotic arm of the robotic system. The acts also include mapping a second path of movement for a movable hardstop of the robotic system. The acts also include executing the first path of movement and the second path of movement such that, during a first operating condition, a clearance is maintained between a bumper of the robotic arm and a contact point of the movable hardstop and, during a second operating condition, the clearance is not maintained between the bumper of the robotic arm and the contact point of the movable hardstop, whereby the bumper and the contact point physically contact each other during the second operating condition.

In accordance with another embodiment, a robotic system includes a robotic member having an arm extension member centered on a central point of the robotic system. The arm extension member also includes a first bumper disposed on a first side of a lip of the arm extension member and a second bumper disposed on a second side of the lip of the arm extension member, where the lip extends from a central portion of the arm extension member. The robotic system also includes a movable hardstop having a rack centered on, and disposed in an annular direction about, the central point of the robotic system, disposed about the central portion of the arm extension member, and separated from the first bumper of the lip of the arm extension member by a first clearance and from the second bumper of the lip of the arm extension member by a second clearance.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure relates to robotics and, more specifically, to a movable hardstop for a movable robotic component (e.g., a robotic arm) of a robotic system. For example, movable robotic components, such as robotic arms, may be controlled by a control system. The control system may map a path of the movable robotic component prior to, or while, instructing the movable robotic component to move. The control system may map the path in view of an intended result of the movable robotic component's movement, and in view of an environment surrounding the movable robotic component. For example, the control system may map the path of the movable robotic component such that the robotic component interacts with an object (e.g., picks up, drops, moves, pushes, pulls, or lifts the object) without interfering with other aspects of the surrounding environment (e.g., without contacting walls of the environment).

In accordance with embodiments of the present disclosure, the robotic system may include a movable hardstop disposed in proximity to at least a portion of the movable robotic component. The movable hardstop (or hardstops) may mimic the path of the movable robotic component mapped by the control system. For example, the control system may instruct the movable hardstop to "follow" the path of the movable robotic component, or the control system may calculate and map a separate path for the movable hardstop (or hardstops) to follow (e.g., based on the path of the movable robotic component, based on the intended result of the movable robotic component's motion, and/or based on the surrounding environment). Accordingly, if the movable robotic component strays from the path mapped for the movable robotic component by the controller, the movable hardstop may block the movable robotic component from interfering with the environment surrounding the robot. Thus, the movable hardstop (e.g., as opposed to an immovable or "stiff" component) is capable of blocking undesired movement (e.g., runaway) of the movable robotic component at different positions, in a variable manner and without unnecessarily limiting a volume of space navigable by the movable robotic component. In other words, embodiments of the present disclosure may include a movable hardstop and no fixed hardstop, such that motion of the robotic arm is not unnecessarily limited (e.g., by a fixed hardstop), but may still be protected by a hardstop (e.g., by a movable hardstop).

Figure 1:
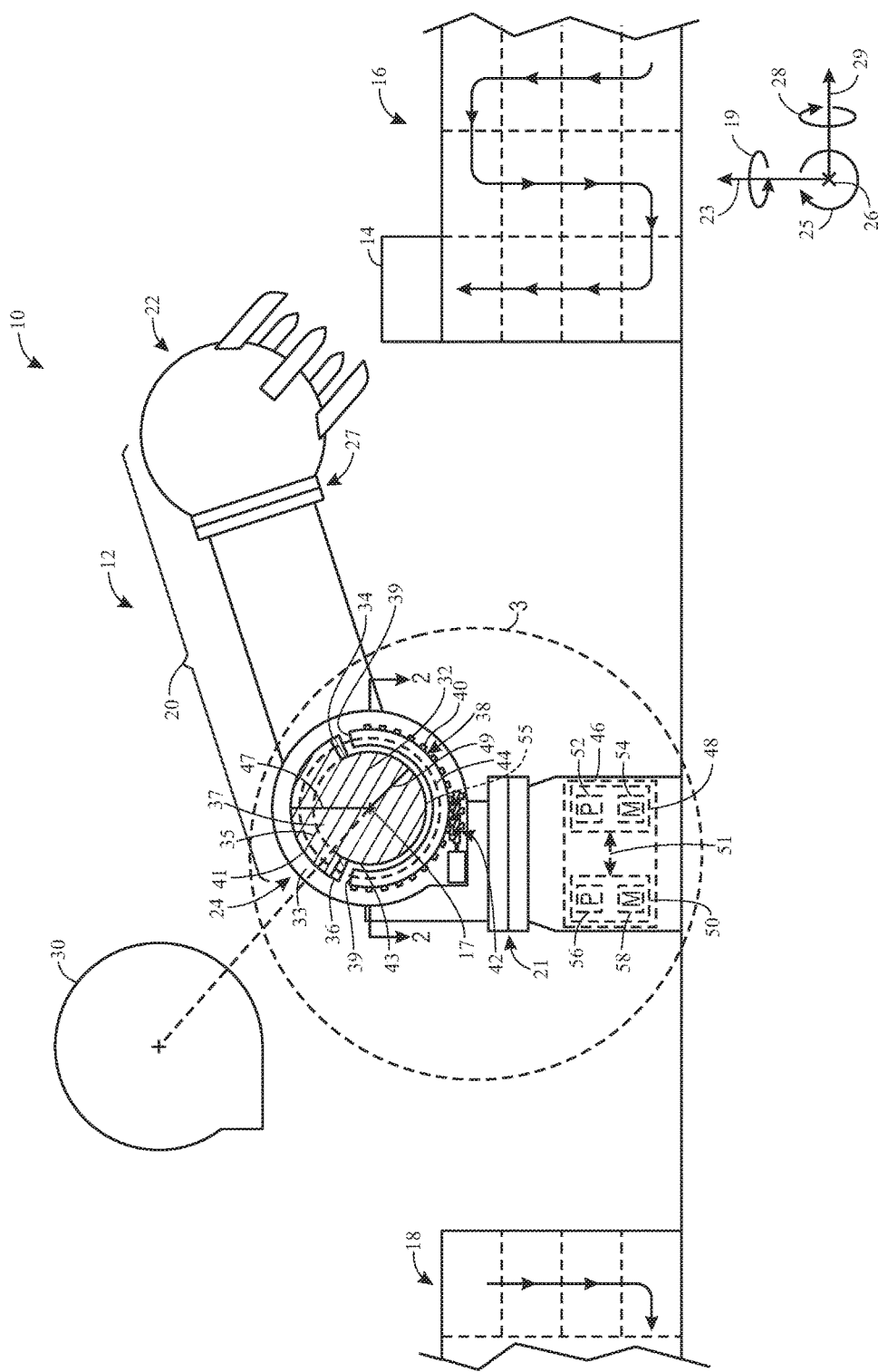
FIG. 1 is a schematic side view of an embodiment of manufacturing plant and robotic system having a movable hardstop, in accordance with an aspect of the present disclosure.

FIG. 1 is a schematic side view of an embodiment of a manufacturing plant 10 and a robotic system 12 disposed in the manufacturing plant 10. In the illustrated embodiment, the robotic system 12 may be configured to move an object 14 from one position (e.g., conveyor system 16) to another position (e.g., conveyer system 18). For example, the robotic system 12 may include a robotic arm 20 having a gripping mechanism 22 configured to grab and move the object 14. The robotic arm 20 may be pivotable, via a first joint 21, in a first annular direction 19 (e.g., extending annularly around a first axis 23). The robotic arm 20 may also be pivotable, via a second joint 24, in a second annular direction 25 (e.g., extending annularly around a second axis 26). Further, the gripping mechanism 22 of the robotic arm 20 may be pivotable, via a third joint 27, in a third annular direction 28 (e.g., extending annularly around axis 29). Accordingly, via the first, second, and third joints 21, 24, 27, the robotic arm 20 may be capable of lifting the object 14 from the first conveyor belt 16, pivoting, and placing the object 14 on the second conveyor system 18. It should be noted that the second joint 24 and corresponding features will be described in detail below, but that the same or similar features and functionality may be additionally or alternatively applicable to the first and/or third joints 21, 27. In other embodiments, additional or fewer such joints may be employed.

As shown in the illustrated embodiment, the second joint 24 may include a cover 30 configured to enclose components of the second joint 24. For example, the cover 30 may be disposed over an arm extension member 32 of the robotic arm 20, where the arm extension member 32 is rigidly coupled with the robotic arm 20 and may impart motion to the robotic arm 20 by rotating about a longitudinal axis 17 extending through the arm extension member 32 (e.g., parallel with the direction 26 in the illustrated embodiment). For example, the arm extension member 32 may be generally cylindrical and may rotate about the longitudinal axis 17 (e.g., in the annular direction 25). Further, the robotic arm 20 may be rigidly coupled with the arm extension member 32, and may extend outwardly from the arm extension member 32. Accordingly, as the arm extension member 32 rotates in the annular direction 25 about the longitudinal axis 17 of the arm extension member 32, the robotic arm 20 extending therefrom may also rotate about the longitudinal axis 17 of the arm extension member 32 (e.g., in the annular direction 25). Thus, the gripping member 22, positioned on a distal end of the robotic arm 20, may rotate about the longitudinal axis 17, thereby facilitating movement of any objects (e.g., the object 14) gripped by the gripping member 22.

As shown, the second joint 24 may also include a stationary base 33 that is not rigidly coupled to the arm extension member 32 or to the robotic arm 20. In other words, as the arm extension member 32 and the robotic arm 20 rigidly coupled thereto rotate about the longitudinal axis 17, the stationary base 33 remains stationary. For example, the stationary base 33 may include an opening 55, extending in the direction 26, through which the arm extension member 32 (or a portion thereof) extends. Accordingly, the arm extension member 32 may rotate within the opening 55 of the stationary base 33, without undesirably abutting the stationary base 33. In other words, the stationary base 33 may not contact the arm extension member 32 in such a way that blocks rotation of the arm extension member 32 in the annular direction 25. It should be noted that the opening 55 in the stationary base 33 is hidden (and shown with a dashed line) by the illustrated arm extension member 32, but will be shown and described in detail with reference to later figures. It should also be noted that, while the arm extension member 32 is generally cylindrical in the illustrated embodiment, the arm extension member 32 may be rectangular, square, triangular, or any other suitable shape. The corresponding opening 55 in the stationary base 33 (e.g., through which the arm extension member 32 extends) may be any shape and/or size that enables movement of the arm extension 32 relative to the stationary base 33 through which the opening 55 extends.

In accordance with present embodiments, the robotic system 12 may include features configured to block undesired motion (e.g., runaway) of the robotic arm 20. For example, as shown, the arm extension member 32 includes a lip 35 extending from a central portion 37 of the arm extension member 32. The central portion 37 may be generally cylindrical and may extend through the opening 55 in the stationary base 33. The lip 35 may be an arcuate shape extending from the central portion 37. Further, the lip 35 may be positioned on the arm extension member 32 outwardly from the stationary base 33 (e.g., relative to direction 26) and, more specifically, outwardly from the opening 55 in the stationary base 33 through which the central portion 37 extends. In other words, the lip 35 may include a first circumferential portion 41 having a first radius 47 that is greater than a second radius 49 of a second circumferential portion 43 of the central portion 37. The opening 55 in the stationary base 33 through which the central portion 37 of the arm extension member 32 extends may be sized to only accommodate the second circumferential portion 43 of the central portion 37 (e.g., the first radius 47 of the first circumferential portion 41 of the lip 35 may be larger than a radius of the opening 55 in the stationary base 33). Thus, the lip 35, having the first circumferential portion 41 with the first radius 47 larger than the second radius 49 of the second circumferential portion 43 of the central portion 37, may only be positioned on the arm extension member 32 outwardly from the stationary base 33 (e.g., from the opening 55 in the stationary base 33), relative to the direction 26 (e.g., outside of the opening 55 extending through the stationary base 33).

As shown, the lip 35, extending from the central portion 37, may include a first bumper 34 and a second bumper 36 disposed thereon. For example, the first and second bumpers 34, 36 extend between the first circumferential portion 41 of the lip 35 and the second circumferential portion 43 of the central portion 37. In other words, the first and second bumpers 34, 36 are disposed on opposing sides of the lip 35. However, in another embodiment (e.g., where the arm extension member 32 is shaped differently), the arm extension member 32 may include only one bumper, as opposed to the illustrated first and second bumpers 34, 36.

The robotic system 12 also includes a movable hardstop 38 having a rack 40 that rotates about the longitudinal axis 17 (e.g., in the annular direction 25) with respect to the stationary base 33 of the second joint 24. For example, in the illustrated embodiment, the movable hardstop 38 includes the rack 40, a pinion 42, and a rail 44. The rail 44 extends in the annular direction 25 (e.g., about the longitudinal axis 17 of the arm extension member 32), and may be positioned on (e.g., rigidly coupled to) the stationary base 33, or may be otherwise incorporated in the robotic system 12 such that the rail 44 remains stationary during operation of the robotic system 12. The rack 40 is mounted on the rail 44, and is configured to move along the rail 44 (e.g., in the annular direction 25 and about the longitudinal axis 17). The pinion 42 may be, for example, a screw member that, when rotated, imparts rotary motion to the rack 40 (e.g., causing the rack 40 to move along the rail 44 and in the annular direction 25 about the longitudinal axis 17). For example, as the pinion 42 rotates in the third annular direction 28, teeth or threads (e.g., helical threads) of the pinion 42 engage teeth of the rack 40, causing the rack 40 to rotate in the second annular direction 25 (e.g., about the longitudinal axis 17 of the arm extension member 32) and along the rail 44.

In general, as described in detail below, the movable hardstop 38 may be controlled such that the rack 40 follows (e.g., mimics) movement of the arm extension member 32 during normal operating conditions. Thus, during normal operating conditions, the rack 40 will not contact either of the bumpers 34, 36 disposed on the lip 35 of the arm extension member 32. However, the robotic system 12 may cause the robotic arm 20 to act undesirably, which may be referred to as undesirable operating conditions. For example, software glitches in a controller of the robotic system 12 may cause the robotic arm 20 to follow an unintended path. During undesirable operating conditions, either of the bumpers 34, 36 disposed on the lip 35 of the arm extension member 32 may contact the rack 40 of the movable hardstop 38, and the rack 40 may then block rotation of the arm extension member 32. In other words, if the robotic arm 20 and the corresponding arm extension member 32 rotate undesirably (e.g., relative to a desired path which includes a timeframe of movement), one of the bumpers 34, 36 of the arm extension member 32 may contact the rack 40 (e.g., along one or more contact points 39 of the rack 40) of the movable hardstop 38, blocking the undesirable movement of the arm extension member 32 and, thus, the robotic arm 20 rigidly coupled thereto. It should be noted, however, that the bumpers 34, 36 (or a single bumper) may be situated, positioned, or disposed on the robotic system 12 in a manner other than what is shown in the illustrated embodiment, and that the term "bumper" used herein refers to the point on the robotic arm 20 (or corresponding arm extension member 32) which may be contacted by the rack 40 of the movable hardstop.

In the illustrated embodiment, the movable hardstop 38 may forcibly block motion of the robotic arm 20 if the movable hardstop 38 contacts either of the bumpers 34, 36. In another embodiment, the bumpers 34, 36 may include sensors disposed therein or thereon, and the sensors may detect a close proximity (or contact) between one of the bumpers 34, 36 and the movable hardstop 38. If close proximity or contact is detected, a control system may stop motion of the robotic arm 20. The control system may also be responsible for determining and executing motion of the robotic arm 20, the movable hardstop 38, or both.

For example, in the illustrated embodiment, the robotic system 12 includes a control system 46 having an arm controller 48 and a hardstop controller 50. In another embodiment, the arm controller 48 and the hardstop controller 50 may be incorporated into a single controller of the control system 46. As shown, the arm controller 48 includes a processor 52 and a memory 54, and the hardstop controller 50 also includes a processor 56 and memory 58. Each memory 54, 58 may be configured to store executable instructions that, when executed by the corresponding processor 52, 56, causes the corresponding controller 48, 50 to perform certain actions. For example, the memory 54 of the arm controller 48 may include instructions that, when executed by the processor 52, cause the arm controller 48 (or processor 52 thereof) to map a path of the robotic arm 20 (which, in some embodiments, includes movement of the gripping mechanism 22). The processor 52 may map the path of the robotic arm 20 in view of a number of factors. For example, the processor 52 may map the path of the robotic arm 20 based on an intended result of the path. The intended result of the path mapped by the arm controller 48, in the illustrated embodiment, is to enable the robotic arm 20 to pick up the object 14 from the first conveyor system 16 and deliver the object 14 to, and place the object 14 on, the second conveyor system 18.

Further, the memory 58 of the hardstop controller 50 may include instructions that, when executed by the processor 56, cause the hardstop controller 50 (or processor 56 thereof) to map a path of the movable hardstop 38. For example, the path of the movable hardstop 38 may be mapped such that the movable hardstop 38 rotates similarly to, or in conjunction with, the intended path of the arm extension member 32. More specifically, the hardstop controller 50 (or processor 56 thereof) may map the path of the movable hardstop 38 based on the intended path mapped for the robotic arm 20 (and corresponding arm extension member 32), and may cause the pinion 42 to rotate at a particular speed and in a particular direction (e.g., in or opposite to the second annular direction 25) to cause the movable hardstop 38 to follow the path. In the illustrated embodiment, the hardstop controller 50 and the arm controller 48 are communicatively coupled, as shown by arrow 51. Accordingly, the arm controller 48 may communicate, to the hardstop controller 50, the path or intended path mapped for the robotic arm 20 (and, thus, the corresponding arm extension member 32). The hardstop controller 50 may receive, from the arm controller 48, the path mapped for the robotic arm 20, and may then map the path for the movable hardstop 38 based on the path mapped for the robotic arm 20. In some embodiments, the arm controller 48 and the hardstop controller 50 may map the paths of the robotic arm 20 and the movable hardstop 38, respectively, separate from one another and based entirely on an intended result of the paths and on a surrounding environment of the manufacturing plant 10. In either embodiment, if the robotic arm 20 (and corresponding arm extension member 32) strays from the path mapped by the arm controller 48 (e.g., due to software failure, runaway, or other causes), the movable hardstop 38 may block the robotic arms 20 movement when one of the bumpers 34, 36 of the arm extension member 32 of the robotic arm 20 contacts the movable hardstop 38. In other words, the movable hardstop 38 (e.g., one of the contact points 39 of the rack 40 of the movable hardstop 38) may physically contact one of the bumpers 34, 36 of the arm extension member 32 of the robotic arm 20.

Figure 2:
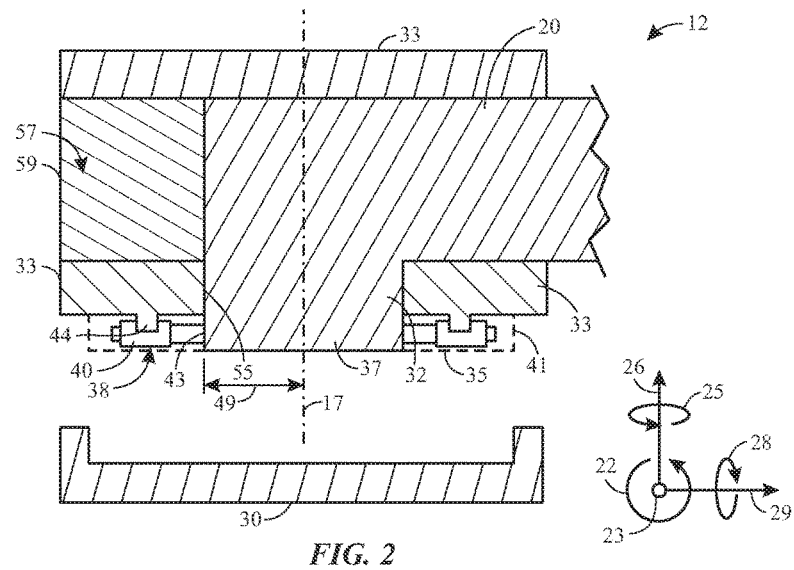
FIG. 2 is a schematic cross-sectional top view of an embodiment of the robotic system of FIG. 1, taken along line 2-2 in FIG. 1, in accordance with an aspect of the present disclosure.

To further illustrate the robotic arm 20, the arm extension member 32, and the stationary base 33 having the opening 55 through which the arm extension member 32 extends, a schematic cross-sectional top view of an embodiment of the robotic system 12, taken along line 2-2 in FIG. 1, is shown in FIG. 2. In the illustrated embodiment, as previously described, the stationary base 33 includes the opening 55 through which the central portion 37 of the arm extension member 32 extends. For example, the second radius 49 of the second circumferential portion 43 corresponding with the central portion 37 of the arm extension member 32 may be substantially the same, or smaller than, a radius of the opening 55 through the stationary base 33. Accordingly, the central portion 37 of the arm extension member 32 may rotate within the opening 55 in the stationary base 33 without features of the stationary base 33 blocking the rotary motion (e.g., about the longitudinal axis 17 and in the annular direction 25) of the arm extension member 32 (and the robotic arm 20 coupled thereto). It should be noted that the stationary base 33 may also include a cavity 57 that facilitates rotary motion of the robotic arm 20 about the longitudinal axis 17 and in the annular direction 25 as well. The stationary base 33 may include a lower portion 59 over which the cavity 57 is disposed.

As shown, the stationary base 33 may include the rail 44 of the movable hardstop 38 coupled thereto. It should be noted that the rail 44 may be considered a component of the movable hardstop 38 despite the fact that the rail 44 is stationary. For example, as previously described, the rack 40 of the movable hardstop 38 may be rotatably coupled to the rail 44, such that the rail 44 remains stationary and the rack 40 rotates, in the annular direction 25, about the rail 44 and around the longitudinal axis 17. Accordingly, the rack 40 may mimic motion of the arm extension member 32. Due to the illustrated perspective, the lip 35 is not visible in the illustrated embodiment (e.g., the lip 35 is disposed above the illustrated cross-section). However, the lip 35 is represented by dotted lines and, as shown be disposed entirely outside of the opening 55 in the stationary base 33. Accordingly, the lip 35 does not block motion of the arm extension member 32 by contacting the stationary base 33; rather, if the arm extension member 32 and corresponding lip 35 rotate along an undesired path, as previously described, the rack 40 may contact the lip 35, thereby blocking motion of the lip 35, the corresponding arm extension member 32, and the corresponding robotic arm 20.

Figure 3:
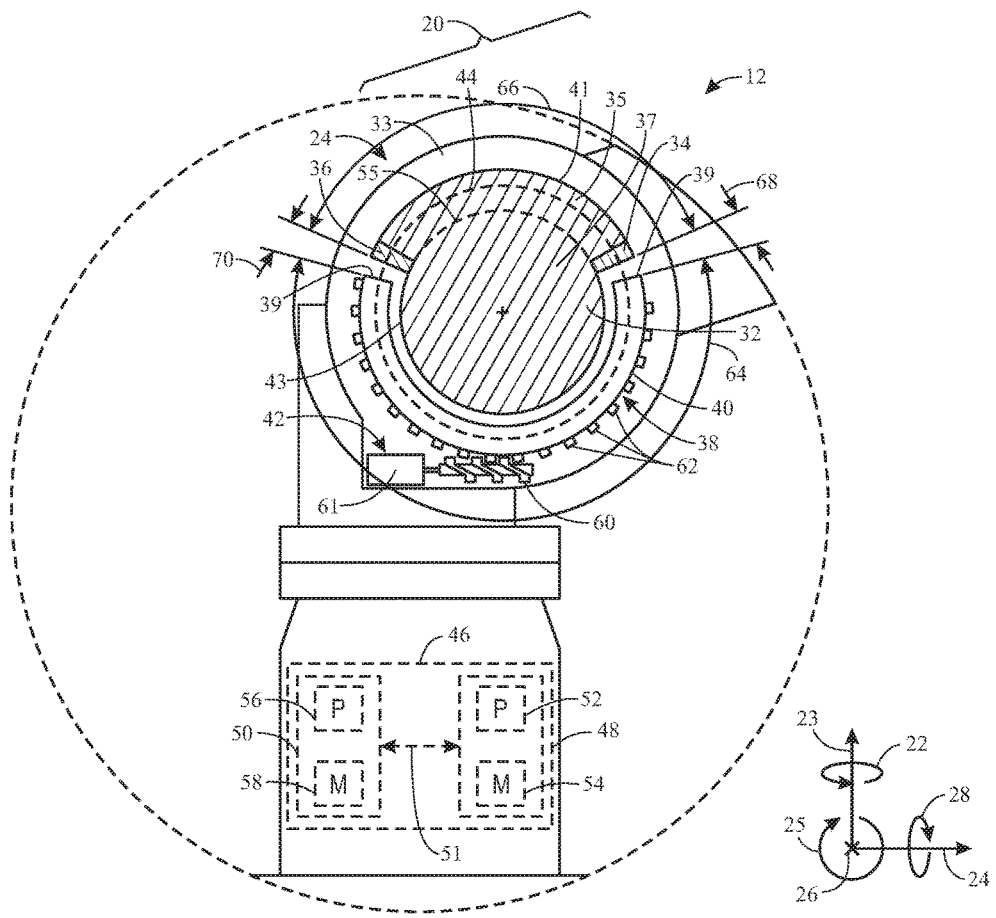
FIG. 3 is a schematic side view of an embodiment of the movable hardstop and a robotic arm of the robotic system of FIG. 1, taken along line 3-3 in FIG. 1, in accordance with an aspect of the present disclosure.

Turning now to FIG. 3, a schematic side view of an embodiment of the movable hardstop 38 and the joint 24 having the arm extension member 32 of the robotic arm 20 of FIG. 1, taken along line 3-3 in FIG. 1, is shown. As previously described, the arm extension member 32 (or, more specifically, the central portion 37 of the arm extension member 32) extends through the stationary base 33 (e.g., the opening 55 of the stationary base 33, as illustrated in FIG. 2) of the second joint 24 of the robotic system 12. Further, the arm extension member 32 may be rigidly coupled to, or integral with, the robotic arm 20.

As previously described, the movable hardstop 38 includes the pinion 42 and the rack 40 (e.g., having teeth 62) mounted on the rail 44, where the rail 44, for example, may be stationary and mounted on the stationary base 33 of the robotic system 12. The pinion 42 in the illustrated embodiment includes a jack screw 60 mounted thereon (e.g., extending from a motor 61 of the pinion 42), where the jack screw 60 engages the teeth 62 of the rack 40. In another embodiment, the pinion 42 may include a different type of screw, teeth, or any other engagement mechanism suitable for engaging the teeth 62 of the rack 40 to drive the rack 40 into rotation in (or opposite to) the second annular direction 25. The hardstop controller 50 of the control system 46 may map a path of the movable hardstop 38, based on a path of the robotic arm 20 (and corresponding arm extension member 32) mapped for the robotic arm 20 by the arm controller 48. Indeed, in some embodiments, the arm controller 48 may communicate the path mapped for the robotic arm 20 to the hardstop controller 50, and the hardstop controller 50 may map the path of the movable hardstop 38 based on (or at least in part on) the path of the robotic arm 20. The hardstop controller 50 and the arm controller 48 may then execute the mapped paths of the movable hardstop 38 and the robotic arm 20 (and corresponding arm extension member 32), respectively.

As shown, the rack 40 of the movable hardstop 38 includes an arcuate length 64 extending in the annular direction 25. The lip 35 of the arm extension member 32 also includes an arcuate length 66 extending in the annular direction 25. Further, clearances 68, 70 exist (e.g., which vary within tolerances of normal operating conditions) between the rack 40 and both the bumpers 34, 36 of the lip 35 of the arm extension member 32. In other words, during normal operating conditions, a first clearance 68 exists between the rack 40 and the bumper 34, and a second clearance 70 exists between the rack 40 and the bumper 36. However, as previously described, the robotic arm 20 may move, in certain operating conditions (e.g., due to software issues or other causes), such that one of the bumpers 34, 36 of the arm extension member 32 contacts the rack 40. Thus, in certain operating conditions, one of the clearances 68, 70 may be reduced to zero as the corresponding bumper 34, 36 contacts the rack 40. It should be noted that, in some embodiments, the first clearance 68 and the second clearance 70 may be, or may be referred to as, a single clearance for discussion purposes. It should also be noted that, during operating, a size of each clearance 68, 70 may fluctuate as the rack 40 and the arm extension member 32 move. Accordingly, "clearance" does not refer to an exact measurement, but rather to any space between the rack 40 and the bumpers 34, 36. The fluctuation in sizes of the clearances 68, 70 may be a result of allowable error margins, as discussed in detail below with reference to later figures, which correspond with physical limitations of the robotic system 12. For example, the rack 40 and the arm extension member 32 may be moved in incremental steps which include non-infinitesimal step-sizes. Thus, during operation of the robotic system 12, sizes of the clearances 68, 70 may change.

Continuing with the illustrated embodiment, the clearances 68, 70 may be sized to include arcuate lengths (e.g., extending in the annular direction 25) based on allowable error margins associated with the mapped paths of the arm extension member 32 and the movable hardstop 38. For example, allowable error margins may correspond with mechanical limitations of the robotic system 12, whereby the rack 40 and the movable hardstop 38 may only be able to follow the corresponding mapped paths of the rack 40 and the movable hardstop 38 to a certain degree of precision based on the aforementioned mechanical limitations (e.g., step-size limitations of the motion imparted to the rack 40 and to the arm extension member 32). For example, the clearances 68, 70 may be sized to be large enough to accommodate movement of the arm extension member 32, the movable hardstop 38, or both within the allowable error margins of the arm extension member 32, the movable hardstop 38, or both described above. Thus, the movable hardstop 38 will not block movement of the arm extension member 32 (and, thus, of the robotic arm 20) so long as the arm extension member 32 (and, thus, the robotic arm 20) and/or the rack 40 of the movable hardstop 38 move within the allowable error margin of the arm extension member 32 (and, thus, of the robotic arm 20).

Further, the annular sizes 64, 66 of the rack 40 and the arm extension member 32 (e.g., extending between the bumpers 34, 36 of the arm extension member) may be sized to accommodate a desired range of motion of the robotic arm 20 in the annular direction 25. For example, because the jack screw 60 of the pinion 42 only rotates and does not move laterally (e.g., in directions 23, 26, and 29), the jack screw 60 can only impart rotation to the rack 40 if the teeth 62 of the rack 40 are in a position to be contacted by (and, thus, are in physical proximity to) the jack screw 60 of the pinion 42. In other words, the range of motion of the rack 40 ends when the rack 40 is no longer positioned over the jack screw 60. Accordingly, range of motion of the rack 40 of the movable hardstop 38 is limited by the arcuate length 64 of the rack 40. However, the rack 40 must also be capable of contacting the bumpers 34, 36 of the arm extension member 32; thus, there must be at least some non-negligible distance 66 of the arm extension member 32 between the bumpers 34, 36. To enable improved range of motion of the movable hardstop 38 (and, thus, improved range of motion of the robotic arm 20 and corresponding arm extension member 32), the annular distance 64 of the rack 40 may be increased and the annular distance 66 of the lip 35 of the arm extension member 32 (e.g., between the bumpers 34, 36 of the arm extension member 32) may be reduced. For example, the annular distance 64 of the rack 40, in degrees along the illustrated rail 44 (e.g., track), may be between 100 and 355 degrees, 200 and 350 degrees, or 300 and 345 degrees. Of course, the distance 66 and the clearances 68, 70 account for the remaining degrees, out of 360 degrees, along the rail 44 (e.g., track).

Figure 4:
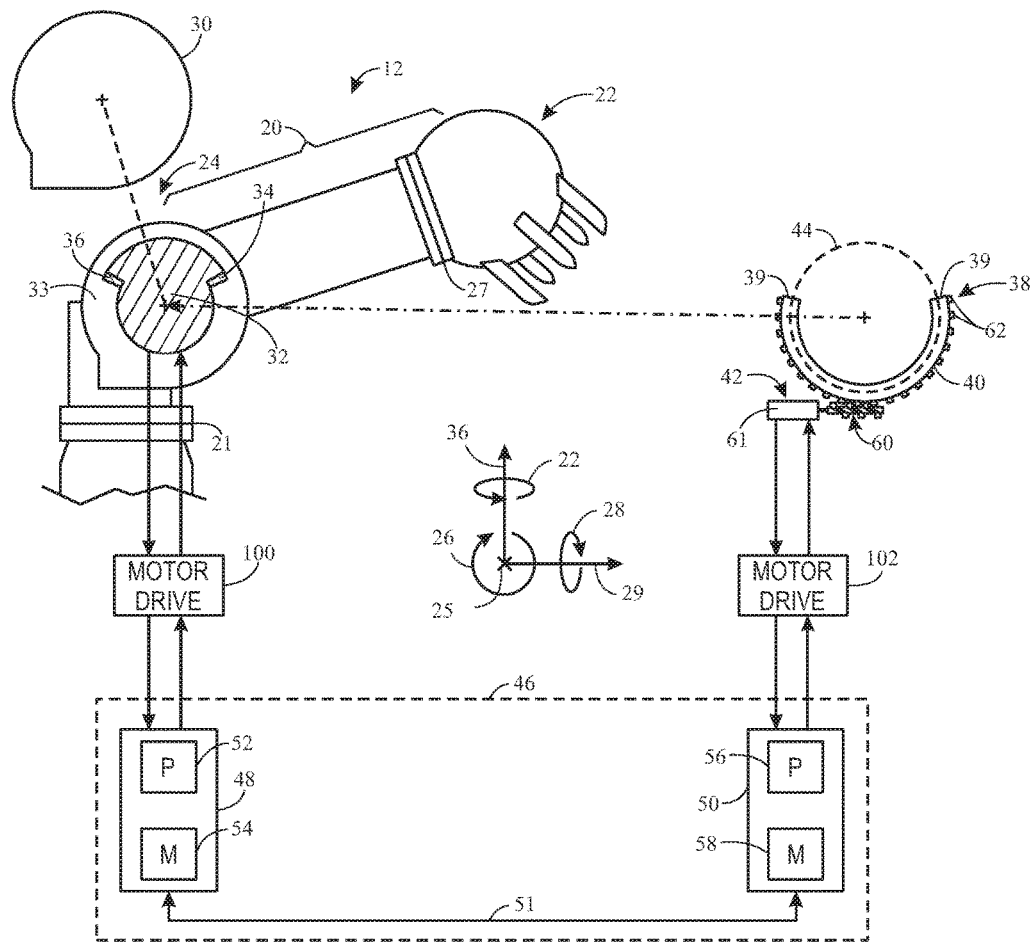
FIG. 4 is an exploded schematic illustration of an embodiment of the robotic arm and the movable hardstop of FIG. 1, and a control system for controlling the robotic arm and the movable hardstop, in accordance with an aspect of the present disclosure.

FIG. 4 illustrates a schematic representation of the robotic system 12 and corresponding control system 46. In the illustrated embodiment, the control system 46, as previously described, includes the arm controller 48 configured to control motion of the robotic arm 20, and the hardstop controller 50 configured to control motion of the movable hardstop 38.

The arm controller 48 includes the memory 54 and the processor 52, where the memory 54 is configured to store instructions that, when executed by the processor 52, cause the arm controller 48 to carry out certain acts or steps. For example, the instructions stored in the memory 54 may, when executed by the processor 52, cause the arm controller 48 (or the processor 52) to map (e.g., calculate, derive, determine) a desired path of motion for the robotic arm 20. The path may depend on an intended result of the motion, and on an environment surrounding the robotic system 12. The intended result of the motion may be encoded in the instructions, or the intended result may be input to the controller 48. For example, an operator may input to the controller 48 (or to the general control system 46) the intended result of the motion (e.g., by inputting to the controller 48 [or control system 46] the desire to move an object from one place to another). The processor 52 may then map the path of the robotic arm 20 to achieve the intended result.

Further, the processor 52 may communicate with at least one motor drive 100 to drive the robotic arm 20 into rotation (e.g., via an intervening motor), based on the path mapped by the arm controller 48 (or processor 52 thereof), to cause the desired motion of the robotic arm 20. Only one motor drive 100 is shown in the illustrated embodiment, coupled with the second joint 24 of the robotic system 12 (e.g., via an intervening motor that is not shown in the illustrated embodiment). However, the path mapped for the robotic arm 20 may require motion of the first joint 21, the second joint 24, the third joint 27, or any combination thereof to achieve the desired motion and the intended result of the desired motion, where each joint 21, 24, 27 may include its own independent motor drive (and/or its own independent motor). Further, as previously described, each joint 21, 24, 27 may further include similar movable hardstops 38 and associated control features described with reference to joint 24 above and below. It should be noted that "intended result" used herein may refer to an overarching intended result (e.g., to move an object from one place to another), or to one of a number of discrete intended results that make up the overarching intended result (e.g., incremental steps of the robotic arm 20 to move an object from one place to another). Further, it should be noted that the arm controller 48 may cause the robotic arm 20 to move after mapping the path, or while mapping the path, or after certain portions of the path are mapped and other portions of the path are not mapped.

The arm controller 48 may communicate to the hardstop controller 50, as illustrated by arrow 52, the path or portions of the path mapped for the robotic arm 20. The hardstop controller 50 includes the memory 58 and the processor 56, where the memory 58 is configured to store instructions that, when executed by the processor 56, cause the hardstop controller 50 to carry out certain acts or steps. For example, the instructions stored in the memory 58 may, when executed by the processor 56, cause the hardstop controller 50 (or the processor 56) to read the path mapped for the robotic arm 20 and received from the arm controller 48. The hardstop controller 50 may then map a path for the movable hardstop 38 based in full or in part on the reading of the path mapped for the robotic arm 20 by the arm controller 48. Alternatively, the hardstop controller 50 (or processor 56 thereof) may map the path of the movable hardstop 38 without ever having received or read the path mapped for the robotic arm 20 by the arm controller 48. For example, the hardstop controller 50 may map the path for the movable hardstop 38 based entirely on the desired motion of the robotic arm 20 (e.g., the same [or a subset of the same] parameter[s] used by the arm controller 48 to map the path of the robotic arm 20).

The hardstop controller 50 may then communicate with a motor drive 102 coupled with the hardstop 38 (e.g., with the motor 61), to drive the jack screw 60 of the pinion 42 of the movable hardstop 38. The jack screw 60 (or other suitable engaging mechanism) engages the teeth 62 of the movable hardstop 38, driving the movable hardstop into rotation in the second annular direction 26 (or opposite to the second annular direction 26).

Figure 5:
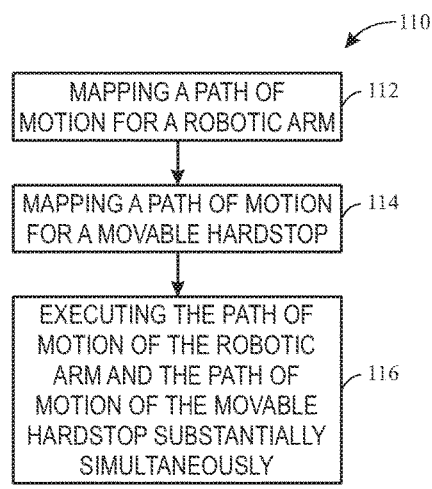
FIG. 5 is a process flow diagram illustrating a method of operating the robotic arm, the movable hardstop, and the control system of FIG. 4, in accordance with an aspect of the present disclosure.

FIG. 5 is a process flow diagram illustrating a method 110 of operating the robotic arm 20, the movable hardstop 38, and the control system 46 of FIG. 4. In the illustrated embodiment, the method 110 includes mapping (block 112) a desired path of motion for a robotic arm. For example, as previously described, an arm controller may map the path of the motion of the robotic arm to achieve a particular action or goal. The action or goal may include any suitable action or goal associated with robotics, such as moving an object from one place to another, assembling an object, coupling one object with another object, and so forth. The path may also be mapped in view of an environment surrounding the robotic system (or robotic arm thereof). For example, the path may be mapped to enable the robotic arm to achieve the desired action or goal without contacting or interfering with the surrounding environment, unless the contacting or interfering with the surrounding environment is a part of the desired action or goal. The desired action or goal may be programmed into a software component of the controller, or the desired action may be entered (e.g., input) by an operator operating the controller. Indeed, any suitable mechanism for entry of the desired action or goal is presently contemplated.

As previously described, the robotic system (or robotic arm thereof) may include any number of joints (e.g., 1 joint, 2 joints, 3 joints, 4 joints, 5 joints, 6 joints, or more joints), each joint being communicatively coupled with the arm controller (or with another controller of the robotic system). Thus, the arm controller may be capable of controlling motion of one or more of the joints of the robotic system. Thus, the arm controller enables movement of the robotic arm, in accordance with the path mapped by the controller, to achieve the desired action or goal of the robotic arm.

The method 110 also includes mapping (block 114) a desired path of motion for a movable hardstop. As previously described, the movable hardstop may be a movable hardstop for a particular joint of the robotic system. In some embodiments, the movable hardstop may be capable of operating as a movable hardstop for more than one joint of the robotic system. For example, the movable hardstop may be movable from a first joint of the robotic system to another joint of the robotic system. Alternatively, multiple joints of the robotic system may be disposed in close proximity with one another, in close proximity with the movable hardstop, or both, such that the movable hardstop is capable of operating as a movable hardstop for multiple joints of the robotic system without having to be displaced from one joint to another joint. Also, as indicated above, each joint may have its own movable hardstop and associated control features.

To map the path of the movable hardstop, a hardstop controller may receive the desired path of motion mapped for the robotic arm from the arm controller. For example, the arm controller and the hardstop controller may be communicatively coupled with one another. In some embodiments, the arm controller and the hardstop controller may be a single, integrated controller. In the illustrated embodiment, the hardstop controller receives the desired path of motion mapped for the robotic arm by the arm controller, and maps a desired path of motion for the movable hardstop in view of the desired path of motion for the robotic arm.

In other embodiments, the hardstop controller may map the desired path of motion of the movable hardstop independent from the desired path of motion mapped for the robotic arm. For example, the hardstop controller may receive the same input for the desired goal of the motion of the robotic arm that the arm controller receives. Based on the input for the desired goal of the motion of the robotic arm, the hardstop controller may map the desired path of motion for the movable hardstop in accordance with the description above. As previously described, the movable hardstop may be capable of operating as a hardstop for more than one joint of the robotic system. In some embodiments, the movable hardstop may be disposed on a track that bridges (e.g., traverses) between two joints of the robotic system. The hardstop controller, depending on which joint requires operation of (e.g., protection by) the movable hardstop, may instruct the movable hardstop to move along the track from one joint to another. Before, during, or after movement of the movable hardstop along the track from one joint to the other, the hardstop controller may map the desired path of motion of the movable hardstop in view of the desired mapped path of motion, or desired action or goal, of the joint being operated by the arm controller.

In the illustrated embodiment, the method 110 also includes executing (block 116) the desired path of motion of the robotic arm and the desired path of motion of the movable hardstop substantially simultaneously. For example, as previously described, the arm controller may execute the desired path of motion mapped for the robotic arm, and the hardstop controller may execute the desired path of motion mapped for the movable hardstop. Thus, the robotic arm moves along an actual path of motion corresponding with the desired path of motion for the robotic arm, and the movable hardstop moves along an actual path of motion corresponding with the desired path of motion for the movable hardstop. In general, the rack of the movable hardstop moves in close proximity with the robotic arm (e.g., with bumpers of the arm extension member of the robotic arm). The movement of the rack of the movable hardstop in close proximity with the bumpers of the arm extension member of the robotic arm, as previously described, enables the robotic arm to move in total freedom along the actual path of motion mapped for the robotic arm during normal operation. However, the close proximity between the rack of the movable hardstop and the bumpers of the arm extension member of the robotic arm also causes the rack of the movable hardstop to block motion of the robotic arm if the robotic arm (and corresponding arm extension member) moves outside of the desired path of motion mapped for the robotic arm, or outside an allowable error margins thereof.

Figure 6:
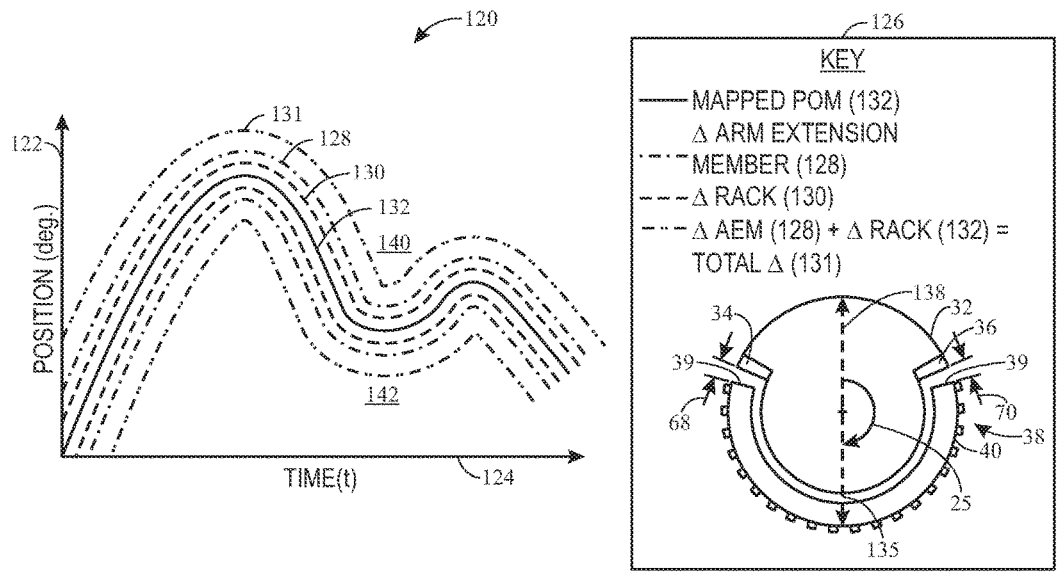
FIG. 6 is an illustration of an embodiment of a position versus time graph mapped for the robotic arm and the movable hardstop of FIG. 1, including allowable error margins, in accordance with an aspect of the present disclosure.

For example, FIG. 6 is an illustration of an embodiment of a graph 120 of position 122 versus time 124. As shown in a key 126 of the graph 120, the graph 120 includes a representation of a mapped desired path of motion 132 of the arm extension member 32 and the rack 40 (e.g., of the movable hardstop 38). It should be noted that, while the arm extension member 32 and the rack 40 may be in different positions, mapped motion of the rack 40 is intended to correspond with (e.g., mimic) mapped motion of the arm extension member 32. Thus, the position of the arm extension member 32 may be phase-shifted to correspond with the position of the rack 40, or vice versa. More specifically, the position of the arm extension member 32 at any given time may correspond with a position of a vector 133 (e.g., centered between the bumpers 34, 36 of the arm extension member 32), the position of the rack 40 at any given time may correspond with the position of a vector 135 (e.g., centered between the contact points 39 of the rack 40), and the vector 133 of the arm extension member 32 may be phase-shifted (e.g., 180 degrees) to align with the vector 135 of the rack 40. In general, the mapped desired path of motion 132 for the vectors 133, 135, after phase shifting, may be substantially the same. It should be noted that the vectors 133, 135 utilized to illustrate the desired path of motion 132 in the illustrated graph 120 may intersect any points of the corresponding arm extension member 32 and rack 40, respectively, any may be phase-shifted accordingly. In other words, the position of the vector 133 illustrated as being centered between the bumpers 34, 36, and the position of the vector 135 illustrated as intersecting a center of the rack 40, are exemplary and non-limiting.

As shown in the illustrated graph 120, an allowable error margin 128 of the arm extension member 32 and an allowable error margin 130 of the rack 40 may also be included on the graph 120. The allowable error margins 128, 130 may correspond with mechanical limitations of the robotic system. For example, the arm extension member 32 and the rack 40 may be rotated via non-infinitesimal, discrete steps. Accordingly, the arm extension member 32 and the rack 40 may be capable of following the mapped desired path of motion 132, during normal operating conditions, within the corresponding allowable error margins 128, 130, respectively. Further, the clearances 68, 70 between the bumpers 34, 36 of the arm extension member 32 and the contact points 39 of the rack 40 are sized to accommodate free motion of the arm extension member 32 and the rack 40 within a combined allowable error margin 131 (e.g., the allowable error margin 128 of the arm extension member 32 and the allowable error margin 130 of the rack 40 of the movable hardstop 38). However, the clearances 68, 70 may be sized just large enough to accommodate only the combined allowable error margin 131. In other words, if the arm extension member 32 and/or the rack 40 move into an area 140 outside of the combined allowable error margin 131, one of the bumpers 34, 36 may contact one of the contact points 39, thereby causing the movable hardstop 38 to block motion of the arm extension member 32 (and, as previously described, the robotic arm [e.g., robotic arm 20 of FIGS. 1-3] rigidly coupled with the arm extension member 32).

Figure 7:
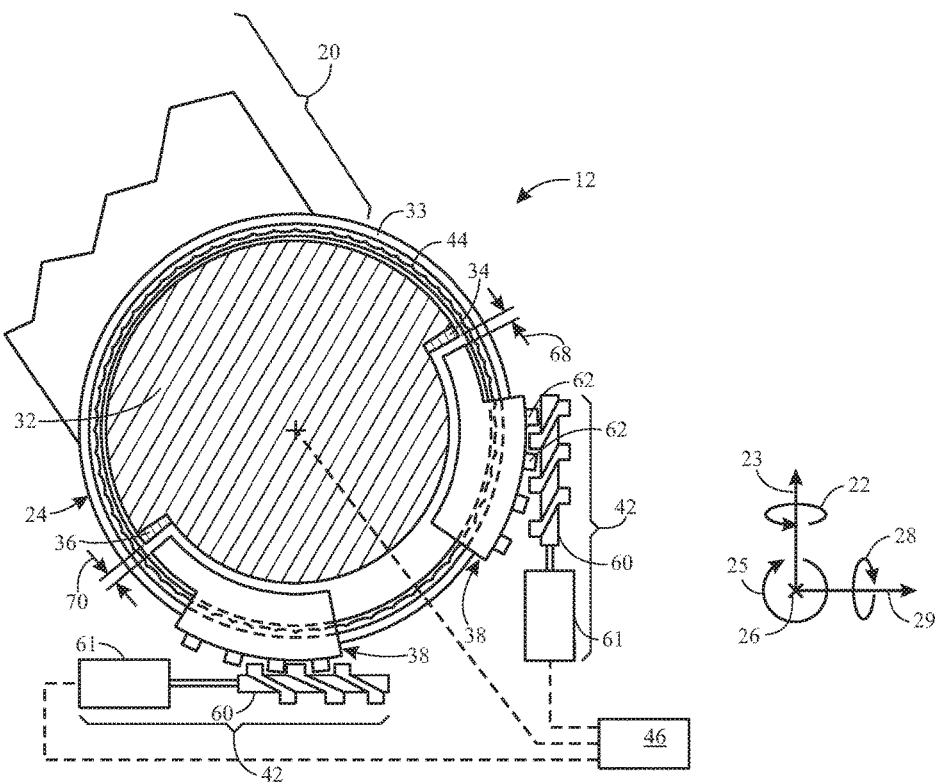
FIG. 7 is a schematic side view of an embodiment of movable hardstops for a robotic arm, in accordance with an aspect of the present disclosure.
Figure 8:
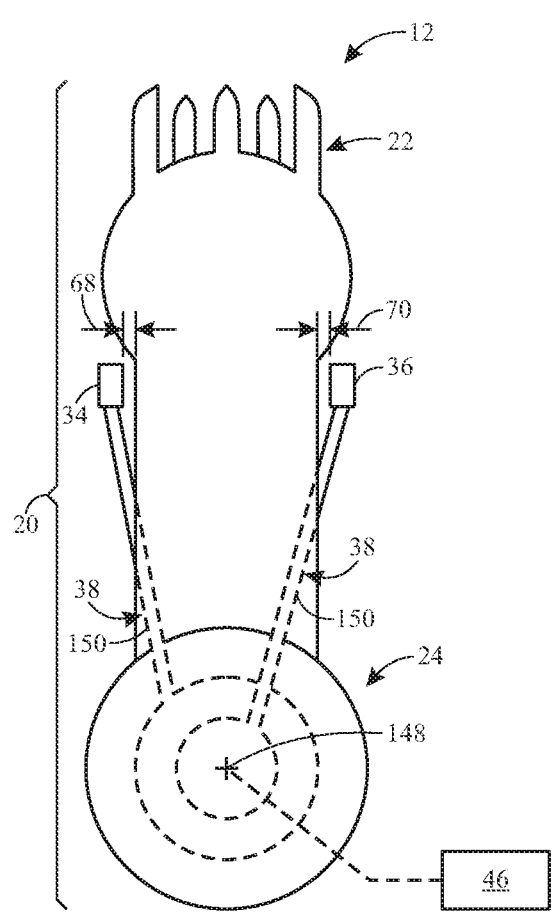
FIG. 8 is a schematic side view of an embodiment of movable hardstops for a robotic arm, in accordance with an aspect of the present disclosure.

Turning now to FIGS. 7 and 8, additional embodiments of the robotic system 12 are shown. For example, in FIG. 7, the robotic system 12 includes two movable hardstops 38, each movable hardstop 38 being disposed proximate to one of the bumpers 34, 36 of the arm extension member 32 of the robotic arm 20 (e.g., extending through the stationary base 33 of the joint 24). Accordingly, both of the movable hardstops 38 may be moved as the arm extension member 32 of the robotic arm 20 moves. For example, the movable hardstops 38 may be moved to substantially maintain the clearances 68, 70, between the movable hardstops 38 and the first and second bumpers 34, 36, respectively. The control system 46 may control motion of the movable hardstops 38, the robotic arm 20, or a combination thereof, as previously described.

In FIG. 8, the robotic system 12 also includes two movable hardstops 38. However, in FIG. 7, each of the movable hardstops 38 is centered on a central point 148 of the joint 24 of the robotic arm 20, and includes a corresponding arm 150 extending from the central point 148. In the illustrated embodiment, the bumpers 34, 36 are disposed on the arms 150 of the movable hardstops 38 themselves, as opposed to being disposed on a component of the robotic arm 20. As the robotic arm 20 moves, so too do the movable hardstops 38 and corresponding bumpers 34, 36. For example, as previously described, desired paths of motion of the robotic arm 20 and the movable hardstops 38 may be mapped and executed by the control system 46. An actual path of motion of the movable hardstops 38 (corresponding with the desired path of motion determined and mapped by the control system 46) may cause the bumpers 34, 36 to maintain the illustrated clearances 68, 70. If the robotic arm 20 moves outside of the desired path of motion of the robotic arm 20 (or, more specifically, outside of an allowable error margin of the desired path of motion), the robotic arm 20 may contact one of the bumpers 34, 36. Additionally or alternatively, the bumpers 34, 36 may include sensors disposed therein or thereon, which detect contact or undesirable proximity of the robotic arm 20. The sensors may communicate the contact or undesirable proximity to the control system 46, which stops motion of the robotic arm 20.

In accordance with embodiments of the present disclosure, a robotic system includes a robotic arm, at least one movable hardstop, and at least one controller. The controller may map a desired path of motion for the robotic arm and a desired path of motion for the at least one movable hardstop, in view of a desired action, goal, or result of the desired path of motion of the robotic arm, in view of an environment surrounding the robotic arm, or both. The controller may map the desired path of motion of the at least one movable hardstop entirely independently from the mapped desired path of motion of the robotic arm, or based at least in part on the mapped desired path of motion of the robotic arm. Because the movable hardstop is movable to track, mimic, or follow the desired path of motion of the robotic arm, the movable hardstop enables protection in the event the robotic arm strays too far from the mapped path of motion of the robotic arm (e.g., outside of allowable error margins), but without unnecessarily limiting the capability or motion of the robotic arm. In other words, the movable hardstop may block motion of the robotic arm outside of the mapped path of the robotic arm, but the movable hardstop does not limit a navigable volume of space available for mapping the path of the robotic arm. Thus, the path of the robotic arm may not be not limited by the movable hardstop whatsoever.

While only certain features of the present disclosure have been illustrated and described herein, many modifications and changes will occur to those skilled in the art. Further, it should be understood that components of various embodiments disclosed herein may be combined or exchanged with one another. It is, therefore, to be understood that the appended claims are intended to cover all such modifications and changes as fall within the true spirit of the disclosure.

The invention claimed is:

1. A robotic system, comprising:
   a robotic arm;
   a movable hardstop disposed proximate to the robotic arm, wherein the movable hardstop is separated from the robotic arm by at least one clearance during a first operating condition, and wherein the movable hardstop physically contacts the robotic arm during a second operating condition; and
   one or more controllers configured to control movement of the robotic arm and movement of the movable hardstop such that the first operating condition is maintained or such that, if the second operating condition occurs, the movable hardstop blocks movement of the robotic arm.

2. The robotic system of claim 1, wherein the movable hardstop comprises:
   a motor directly or indirectly communicatively coupled with the one or more controllers, whereby the one or more controllers controls movement of the movable hardstop by controlling movement of the motor;
   a pinion driven by the motor; and
   a rack driven by the pinion, wherein the rack is separated from the robotic arm by the at least one clearance during the first operating condition, and wherein the rack physically contacts the robotic arm during the second operating condition.

3. The robotic system of claim 2, wherein the robotic system comprises a rail on which the rack is mounted and about which the rack is moved by the pinion.

4. The robotic system of claim 2, wherein the pinion comprises a screw and the rack comprises teeth, and wherein the screw of the pinion engages with the teeth of the rack.

5. The robotic system of claim 1, wherein the robotic arm comprises an arm extension member centered about a central point and having a first bumper and a second bumper, wherein the movable hardstop comprises a rack centered about the central point, wherein the rack is separated from the first bumper of the arm extension member by a first clearance and from the second bumper of the arm extension member by a second clearance during the first operating condition, and wherein the rack comprises a first contact point that physically contacts the first bumper or a second contact point that physically contacts the second bumper during the second operating condition.

6. The robotic system of claim 5, wherein the arm extension member comprises a lip extending from a central portion, wherein the lip comprises a first circumferential portion having a first radius greater than a second radius of a second circumferential portion of the central portion, wherein the first bumper and the second bumper are disposed on opposing sides of the lip, and wherein the rack is disposed annularly about the central portion of the arm extension member such that, during the second operating condition, the first contact point of the rack physically contacts the first bumper or the second contact point of the rack physically contacts the second bumper.

7. The robotic system of claim 1, wherein the robotic arm and the movable hardstop are separated from one another during the first operating condition by a first clearance and by a second clearance, and wherein the robotic arm and the movable hardstop are only separated from one another during the second operating condition by either the first clearance or by the second clearance.

8. The robotic system of claim 1, wherein the one or more controllers comprise an robotic arm controller and a movable hardstop controller, wherein the robotic arm controller maps a desired path of motion of the robotic arm, and wherein the movable hardstop controller maps a desired path of motion of the movable hardstop based on the desired path of motion of the robotic arm mapped by the arm controller.

9. A control system for a robotic system, comprising:
a controller having a processor and a memory, wherein the memory is configured to store instructions that, when executed by the processor, cause the controller to perform acts, the acts comprising:
mapping a first path of movement for a robotic arm of the robotic system;
mapping a second path of movement for a movable hardstop of the robotic system; and
executing the first path of movement and the second path of movement such that, during a first operating condition, a clearance is maintained between a bumper of the robotic arm and a contact point of the movable hardstop and, during a second operating condition, the clearance is not maintained between the bumper of the robotic arm and the contact point of the movable hardstop, whereby the bumper and the contact point physically contact each other during the second operating condition.

10. The control system of claim 9, wherein the controller comprises an arm controller that maps and executes the first path of movement for the robotic arm of the robotic arm system, wherein the controller comprises a movable hardstop controller that maps and executes the second path of movement for the robotic arm system, and wherein the arm controller and the movable hardstop controller are communicatively coupled together.

11. The control system of claim 10, wherein the arm controller is configured to communicate the first path of movement mapped for the robotic arm to the movable hardstop controller while, or prior to when, the second controller maps the second path of movement for the movable hardstop.

12. A robotic system, comprising:
a robotic member comprising an arm extension member centered on a central point of the robotic system, wherein the arm extension member comprises a first bumper disposed on a first side of a lip of the arm extension member and a second bumper disposed on a second side of the lip of the arm extension member, and wherein the lip extends from a central portion of the arm extension member; and
a movable hardstop having a rack centered on, and extending in an annular direction about, the central point of the robotic system, disposed about the central portion of the arm extension member, and separated in the annular direction from the first bumper of the lip of the arm extension member by a first clearance and from the second bumper of the lip of the arm extension member by a second clearance.

13. The robotic system of claim 12, comprising a controller configured to map and execute movement of the robotic member and the movable hardstop, wherein the controller, during a first operating condition, maintains the first and second clearances, and wherein, during a second operating condition, the rack contacts either the first bumper or the second bumper.

14. The robotic system of claim 13, wherein the movable hardstop comprises:
a motor directly or indirectly communicatively coupled with the controller; and
a pinion engaged with the rack, wherein the controller drives the motor, wherein the motor drives the pinion, and wherein the pinion drives the rack.

15. The robotic system of claim 14, wherein the robotic system comprises a rail on which the rack is mounted and about which the rack is moved by the pinion.

16. The robotic system of claim 14, wherein the pinion comprises a screw and the rack comprises teeth, and wherein the screw of the pinion engages with the teeth of the rack.

17. The robotic system of claim 12, wherein the first clearance and the second clearance are sized to accommodate allowable error margins of the robotic system.

18. The robotic system of claim 13, wherein the controller comprises a robotic member controller and a movable hardstop controller, wherein the robotic member controller maps and executes the movement for the robotic member, and wherein the movable hardstop controller maps and executes the movement for the movable hardstop based at least in part on the movement mapped by the robotic member controller for the robotic member.

19. The robotic system of claim 12, wherein the rack extends in the annular direction within a range of 100 degrees and 355 degrees about the central point of the robotic system.

20. The robotic system of claim 12, comprising a sensor disposed on the first bumper or the second bumper, wherein the sensor detects contact with, or close proximity to, the rack, and wherein movement of the robotic member, movement of the rack, or both is stopped upon the detected contact or close proximity.

\* \* \* \* \*